United States Patent
Hemmi et al.

(10) Patent No.: US 11,204,062 B2
(45) Date of Patent: Dec. 21, 2021

(54) TILTING PAD JOURNAL BEARING AND ROTARY MACHINE USING SAME

(71) Applicant: Hitachi Industrial Products, Ltd., Tokyo (JP)

(72) Inventors: Makoto Hemmi, Tokyo (JP); Naohiko Takahashi, Tokyo (JP); Jun Ichimura, Tokyo (JP); Motoki Sato, Tokyo (JP)

(73) Assignee: HITACHI INDUSTRIAL PRODUCTS, LTD., Tokyo (JP)

( * ) Notice: Subject to any disclaimer, the term of this patent is extended or adjusted under 35 U.S.C. 154(b) by 0 days.

(21) Appl. No.: 16/766,345

(22) PCT Filed: Aug. 22, 2018

(86) PCT No.: PCT/JP2018/030974
§ 371 (c)(1),
(2) Date: May 22, 2020

(87) PCT Pub. No.: WO2019/163162
PCT Pub. Date: Aug. 29, 2019

(65) Prior Publication Data
US 2020/0355219 A1  Nov. 12, 2020

(30) Foreign Application Priority Data
Feb. 22, 2018  (JP) .............................. JP2018-029607

(51) Int. Cl.
F16C 17/03  (2006.01)
F16C 33/10  (2006.01)
F16C 37/00  (2006.01)

(52) U.S. Cl.
CPC .......... *F16C 17/03* (2013.01); *F16C 33/1045* (2013.01); *F16C 37/002* (2013.01)

(58) Field of Classification Search
CPC .... F16C 17/03; F16C 17/035; F16C 33/1045; F16C 33/105; F16C 33/106; F16C 33/108; F16C 33/1085; F16C 37/002
See application file for complete search history.

(56) References Cited

FOREIGN PATENT DOCUMENTS

| | | |
|---|---|---|
| JP | 52-085053 U | 6/1977 |
| JP | 10-026129 A | 1/1998 |

(Continued)

OTHER PUBLICATIONS

International Search Report of PCT/JP2018/030974 dated Nov. 20, 2018.

*Primary Examiner* — James Pilkington
(74) *Attorney, Agent, or Firm* — Mattingly & Malur, PC (57) ABSTRACT

A tilting pad journal bearing is arranged such that a circumferential relative position of an opening portion of an oil feeding hole to supply lubricant oil to a sliding portion of a bearing pad with respect to the bearing pad differs depending on the position of each bearing pad. For a bearing pad under a rotary shaft which supports the load of the rotary shaft, the circumferential position of an opening portion of an oil feeding hole with respect to the bearing pad is set toward an upstream side of a space between pads in a rotating direction of the rotary shaft. For a bearing pad above the rotary shaft, the circumferential position of an opening portion of an oil feeding hole with respect to the bearing pad is set toward a downstream side of a space between pads in the rotating direction of the rotary shaft.

5 Claims, 7 Drawing Sheets

(56) References Cited

FOREIGN PATENT DOCUMENTS

| JP | 05-332359 A | | 11/2001 |
|---|---|---|---|
| JP | 2010-216318 A | | 9/2010 |
| WO | wo2012114445 | * | 8/2012 |
| WO | WO2017086153 | * | 11/2016 |

* cited by examiner

TILTING PAD JOURNAL BEARING AND ROTARY MACHINE USING SAME

TECHNICAL FIELD

The present invention relates to a tilting pad journal bearing and a rotary machine using the same, such as a centrifugal compressor.

BACKGROUND ART

A tilting pad journal bearing is used in a rotary machine rotating at high speed, like a centrifugal compressor. In the tilting pad journal bearing, heat generated by shear in an oil film causes the oil film temperature to rise. Particularly, in a machine rotating at high speed such as a centrifugal compressor, there is a possibility of causing damage to the bearing, because shaft surface speed (hereinafter, peripheral speed) is high and also there is a large increase in temperature. To avoid this, a method for suppressing a rise in pad temperature is proposed, as described in e.g., PTL 1; according to this method, oil feeding holes for feeding lubricant oil to upper pads are formed to have a smaller cross-sectional area than other oil feeding holes, so that lubricant oil is fed sufficiently to lower pads to which a rotary shaft mostly applies a load, whereas a smaller adequate quantity of lubricant oil is fed to the upper pads under a comparatively low load, and, thus, the oil feed amount of lubricant oil for the entire bearing is reduced.

CITATION LIST

Patent Literature

PTL 1: Japanese Patent Application Laid-Open No. Hei 10-26129

SUMMARY OF INVENTION

Technical Problem

Like a bearing described in PTL 1, in a structure in which oil feed quantity is adjusted by making the cross-sectional area (diameter) of an oil feeding hole differ with respect to each pad, a difference in the quantity of oil that is fed to each pad is determined by a difference in the diameters of oil feeding holes, regardless of operating conditions (e.g., peripheral speed of the rotary shaft). However, for example, a pad on a load-applied side experiences a larger increase in pad temperature under a condition of high peripheral speed and, therefore, if a larger quantity of oil can be fed to a pad on the load-applied side under the condition of high peripheral speed, it is possible to realize speeding up a rotary machine, suppressing a rise in bearing temperature.

An object of the present invention resides in providing a tilting pad journal bearing in which it is possible to suppress a rise in the temperature of a bearing pad on a load-applied side by feeding a larger quantity of oil to the bearing pad on the load-applied side under the condition of high peripheral speed and a rotary machine using such bearing.

Solution to Problem

The present invention resides in a tilting pad journal bearing which supports an axial load of a rotary shaft of a rotary machine, arranged such that a circumferential relative position of the opening portion of an oil feeding hole to supply lubricant oil to a sliding portion of a bearing pad with respect to the bearing pad differs depending on the position of each bearing pad.

The oil opening portion of an oil feeding hole is positioned between bearing pads, i.e., between a bearing pad to which oil is to be fed and a bearing pad which is adjacent upstream of the bearing pad. For example, for a bearing pad under the rotary shaft which supports the axial load of the rotary shaft, the circumferential position of the opening portion of an oil feeding hole with respect to the bearing pad is set toward an upstream side between bearing pads in a rotating direction of the rotary shaft. Or for a bearing pad above the rotary shaft on a side opposite to a side supporting the axial load of the rotary shaft, the circumferential position of the opening portion of an oil feeding hole with respect to the bearing pad is set toward a downstream side between bearing pads in the rotating direction of the rotary shaft.

Advantageous Effects of Invention

According to the present invention, a difference in the quantity of oil that is fed to each bearing pad can be changed depending on operating conditions of a rotary machine, a larger quantity of oil can be fed to a bearing pad on a load-applied side under a condition of high peripheral speed, and it is possible to suppress a rise in the temperature of a bearing pad on the load-applied side under the condition of high peripheral speed.

Problems, configurations, and advantageous effects other than described above will be made apparent from the following description of embodiments.

DESCRIPTION OF EMBODIMENTS

In the following, examples of the present invention will be described with the aid of the drawings.

First, an overall structure of a tilting pad journal bearing which is one example of the present invention is described with reference to FIG. 1 and FIG. 2.

Additionally, the overall structure of the tilting pad journal bearing device is not limited to this.

Figure 1:
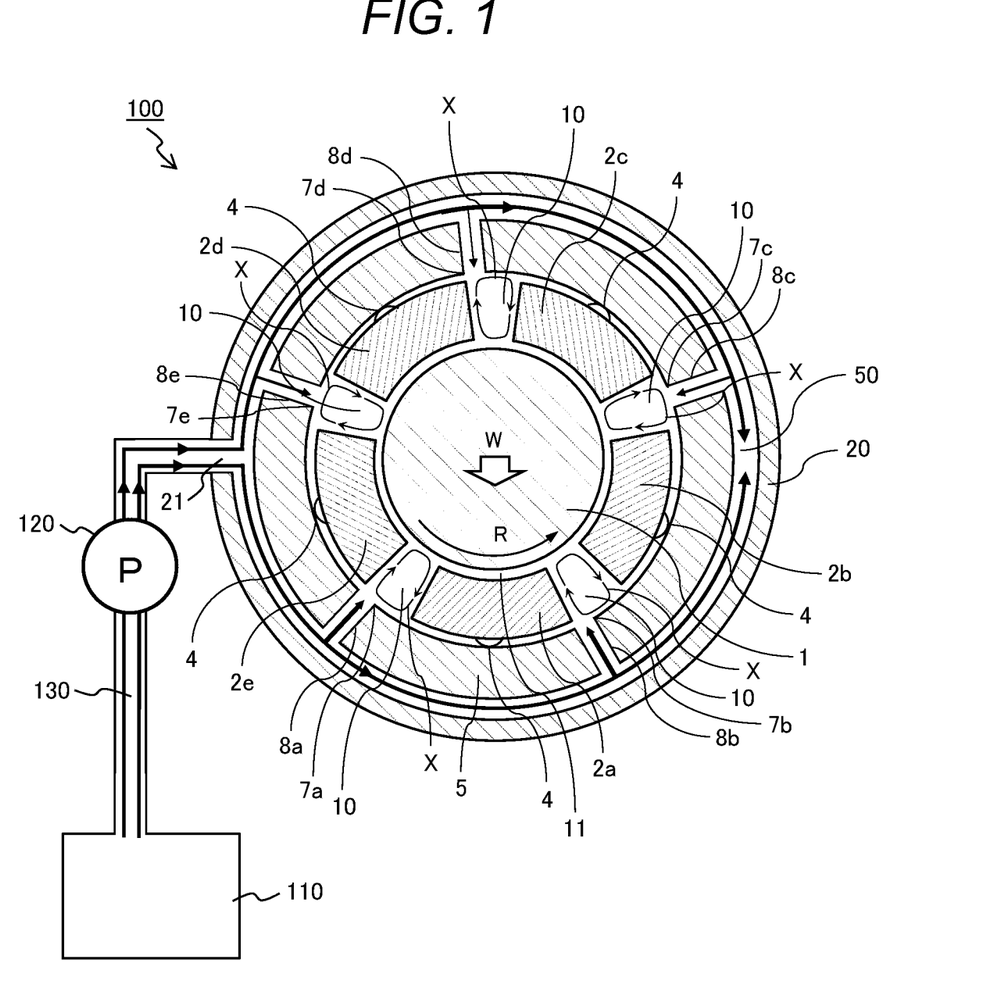
FIG. 1 is a transverse sectional view depicting an outline of a tilting pad journal bearing of an example of the present invention.

FIG. 1 is a transverse sectional view depicting an outline of the overall structure of the tilting pad journal bearing. FIG. 2 is a longitudinal sectional view depicting an outline of the tilting pad journal bearing.

Figure 2:
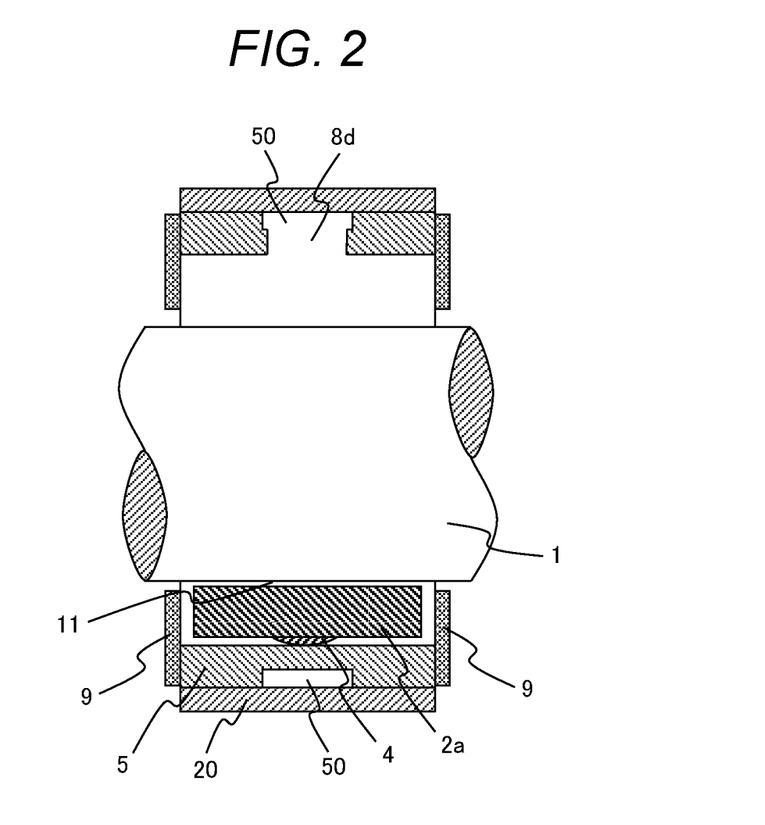
FIG. 2 is a longitudinal sectional view depicting an outline of the tilting pad journal bearing of the example of the present invention.

The tilting pad journal bearing 100 depicted in FIG. 1 and FIG. 2 is an oil bath lubricated journal bearing which supports the axial load of a rotary shaft 1. As depicted in FIG. 1, the tilting pad journal bearing 100 includes plural tilting pads (which may also simply be referred to as pads) 2a, 2b, 2c, 2d, 2e (2a to 2e), plural pivots 4, a cylindrical bearing housing (which may also simply be referred to as a housing) 5, and a bearing casing 20. In FIG. 1, the five bearing pads 2a to 2e are arranged in place in a circumference direction of the rotary shaft 1 to face the outer peripheral surface of the rotary shaft 1. The pivots 4 with curvature are mounted in place on a back surface of the respective bearing pads 2a to 2e. The respective pivots 4 contact the inner wall of the bearing housing 5 via a point, line, or plane. Thus, via the pivots 4, the respective bearing pads 2a to 2e are swingably supported by the bearing housing 5.

Additionally, a structure may be modified such that the pivots 4 are disposed on the inner wall of the bearing housing 5 to support the bearing pads 2a to 2e via a point, line, or plane. The bearing casing 20 holds the bearing housing 5 with its inner periphery contacting the outer periphery of the housing, as depicted in FIG. 2.

An annular oil guide groove (a groove around the outer periphery of the housing) 50 which is a circumferentially communicating groove is disposed on the outer peripheral surface of the bearing housing 5. Also, in the bearing housing 5, plural oil feeding holes 8a, 8b, 8c, 8d, 8e (8a to 8e) are disposed opening toward a radially inward direction from the oil guide groove 50. The oil feeding holes 8a to 8e have opening portions 7a, 7b, 7c, 7d, 7e (7a to 7e) on the inner peripheral surface of the bearing housing 5. The oil feeding holes 8a to 8e are disposed for each of the bearing pads 2a to 2e. In other words, the number of the oil feeding holes is equal to the number of the bearing pads (five holes respective for each of the bearing pads 2a to 2e in FIG. 1). In addition, the oil feeding holes 8a to 8e are disposed, from the bottom of the oil guide groove 50 around the outer periphery of the bearing housing 50, to penetrate the inner peripheral surface of the bearing housing 5, and the opening portions 7a to 7e are formed on the inner peripheral surface of the bearing housing 5. The opening portions 7a to 7e of the oil feeding holes 8a to 8e are formed to face a space 10 between each of the bearing pads 2a, 2b, 2c, 2d, 2e to which lubricant oil is fed through one of the oil feeding holes 8a to 8e and its adjacent bearing pad 2e, 2a, 2b, 2c, 2d in a direction opposite to a rotating direction R (upstream in the rotating direction) R. For example, the opening portion 7a of an oil feeding hole 8a is positioned to face a space 10 between the bearing pad 2a and the bearing pad 2e. Each space 10 communicates with the oil guide groove 50 through the opening portions 7a to 7e and the oil feeding holes 8a to 8e.

In the bearing casing 20, an oil guide hole 21 communicating with the oil guide groove 50 is disposed opening toward a radially inward direction. A main oil feed pipe 130 is connected to the oil guide hole 21, and lubricant oil is supplied from an oil tank 110 through the main oil feed pipe 130 by a pump 120 disposed in the main oil feed pipe 130. Lubricant oil fed to the oil guide hole 21 flows into the oil guide groove 50, flows across along a circumferential direction of the bearing housing 5, and the oil is distributed by the oil feeding holes 8a to 8e and flows into the interior of the bearing (spaces 10 between bearing pads in a circumferential direction).

As depicted in FIG. 2, sealings 9 are disposed laterally on both sides of the bearing housing 5 in an axial direction. The sealings 9 are formed of an annular member. The inner peripheries of the sealings 9 are positioned nearer to the rotary shaft 1 than the inner periphery of the bearing housing 5, and clearances are formed between the inner peripheries of the sealings 9 and the outer periphery of the rotary shaft 1. Having flowed into the interior of the bearing, lubricant oil is stored inside the bearing by the sealings 9, and the interior of the bearing is filled with the lubricant oil, i.e., placed in an oil bath state. That is, a pad storage space is formed by the rotary shaft 1, the bearing housing 5, and the sealings 9, and the interior of the pad storage space is filled with lubricant oil. Then, as much of the lubricant oil as a quantity of oil supplied through the oil guide hole 21 is ejected through the clearances between the rotary shaft 1 and the sealings 9. Generally, the clearances between the rotary shaft 1 and the sealings 9 are designed to be larger than the clearances between the rotary shaft 1 and the tilting pads 2.

When the rotary shaft 1 rotates in a rotating direction R indicated in FIG. 1, lubricant oil having flowed into the interior of the bearing through the oil feeding holes 8a to 8e once goes through inter-pad spaces 10 and is supplied to sliding portions 11 existing between the rotary shaft 1 and the inner peripheries of the bearing pads 2a to 2e. Then, thin fluid films (oil films) are formed in the sliding portions 11, and pressure is generated inside the oil films, so that the tilting pad journal bearing can bear a radial load W of the rotary shaft while preventing the rotary shaft and the bearing pads from contacting each other. Along with the rotation of the rotary shaft 1, shear stress is produced inside the oil films and, consequently, heat is generated (heat generate by shear). Swirling flows of lubricant oil existing in the spaces 10, as indicated by arrows X, are induced by the motion of the rotary shaft 1.

Figure 3:
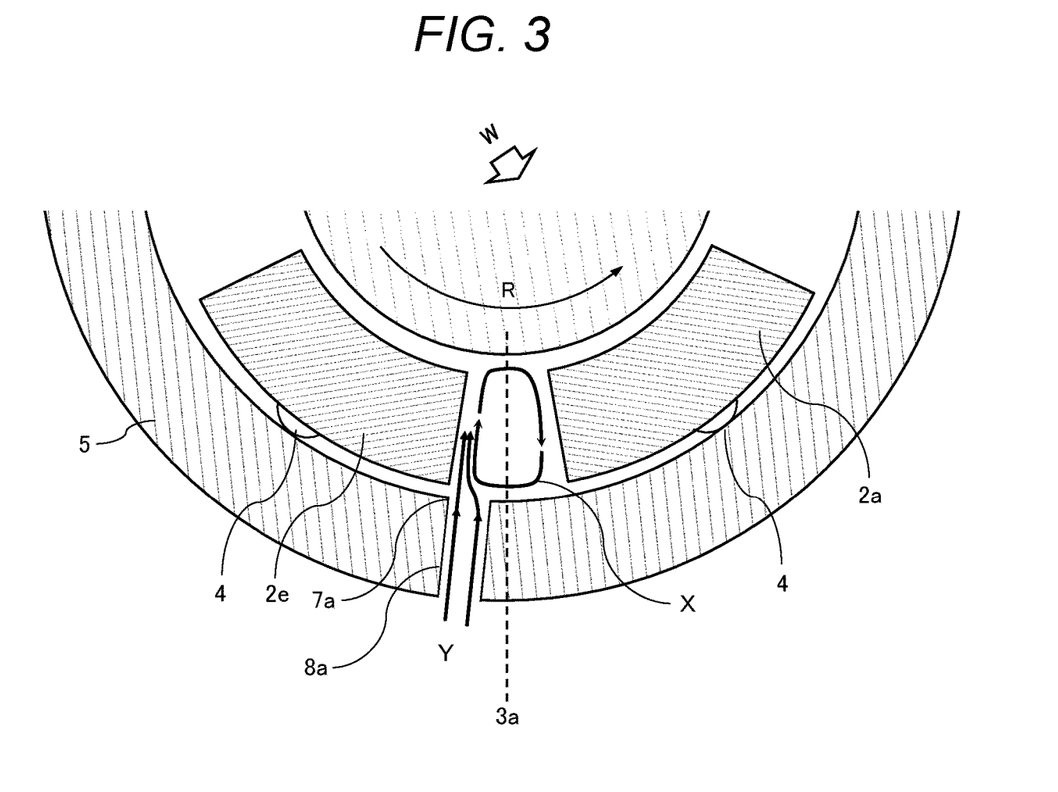
FIG. 3 is a partial transverse sectional view depicting a detailed structure of the tilting pad journal bearing of the example of the present invention.
Figure 4:
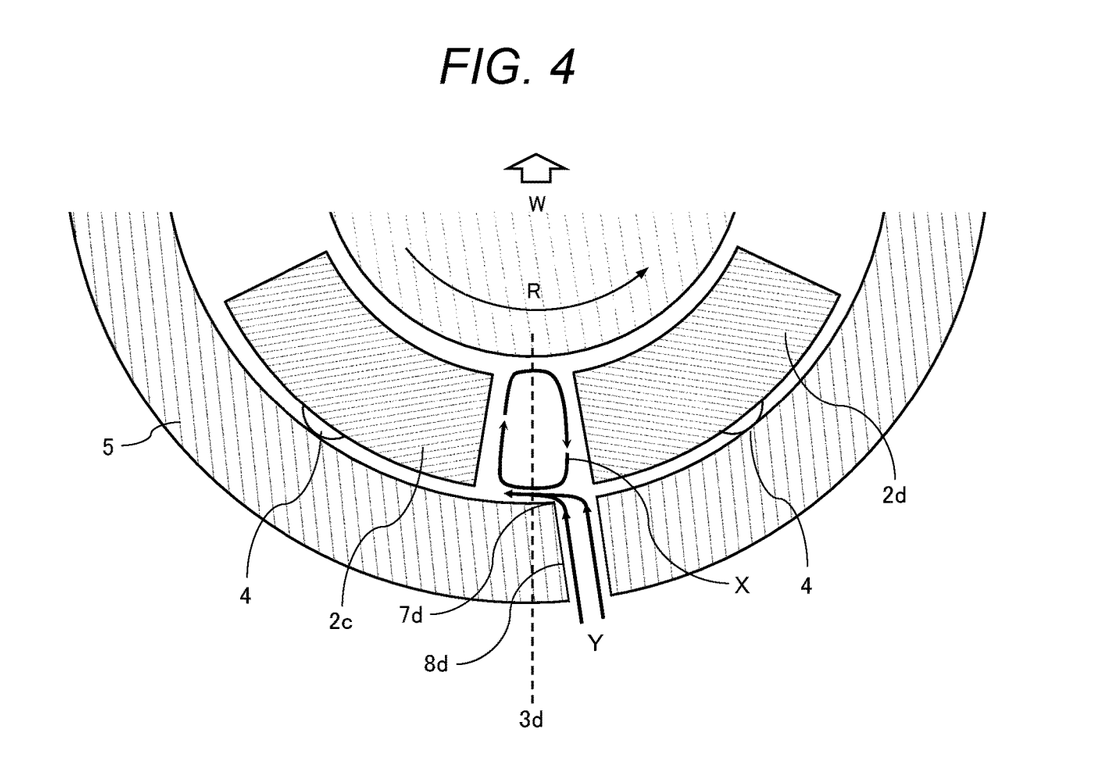
FIG. 4 is a partial transverse sectional view depicting a detailed structure of the tilting pad journal bearing of the example of the present invention.

Then, a detailed structure of the example of the present invention is described with FIG. 3 and FIG. 4. FIG. 3 and FIG. 4 are partially enlarged views of the tilting pad journal bearing in FIG. 1.

In FIG. 3, the bearing pad 2a placed on a side in a load direction indicated by an arrow W (on a load-applied side/lower side as viewed in a direction of gravitational force) and the bearing pad 2e positioned upstream of the beading pad 2a in the rotating direction are depicted with the rotary shaft 1 and the bearing housing 5. Lubricant oil that is supplied to the bearing pad 2 is supplied view a space between the bearing pads 2e and 2a. To the space between the bearing pads 2e and 2a, lubricant oil is supplied via an oil feeding hole 8a and an opening portion 7a disposed on the inner peripheral surface of the bearing housing 5 between the bearing pads 2e and 2a. The opening portion 7a is disposed toward an upstream side (in a direction opposite to the rotating direction) relative to an inter-pad central position 3a in circumferential direction between the bearing pads 2e and 2a. In other words, for the oil feeding hole for feeding oil to the bearing pad on the load-applied side, its opening portion is disposed near to a rearward end of its upstream bearing pad.

In FIG. 4, a bearing pad 2d placed on a side in a direction opposite to the load direction indicated by the arrow W (on a load-free side/upper side as viewed in the direction of gravitational force) and a bearing pad 2c positioned upstream of the bearing pad 2d in the rotating direction are depicted with the rotary shaft 1 and the bearing housing 5.

Lubricant oil that is supplied to the bearing pad 2d is supplied view a space between the bearing pads 2c and 2d. To the space between the bearing pads 2c and 2d, lubricant oil is supplied via an oil feeding hole 8d and an opening portion 7d disposed on the inner peripheral surface of the bearing housing 5 between the bearing pads 2c and 2d. The opening portion 7d is disposed toward a downstream side (in the rotating direction) relative to an inter-pad central position in circumferential direction 3d between the bearing pads 2c and 2d. In other words, for the oil feeding hole for feeding oil to the bearing pad on the load-free side is disposed near to a forward end of its downstream bearing pad.

As will be appreciated from the foregoing description, in the present example, a circumferential relative position between an oil feeding hole and a bearing pad to which lubricant oil is fed, supplied through the oil feeding hole, differs between the load-applied side and the load-free side. In other words, a circumferential relative position between the opening portion of an oil feeding hole and a space between bearing pads to which lubricant oil is supplied through the oil feeding hole differs depending on the circumferential position of a bearing pad.

Then, operational advantages of the present example are described.

In the structure depicted in FIG. 3, lubricant oil flowing in through the oil feeding hole 8a flows into the space, as indicated by an arrow Y. At this time, in the space 10, a swirling flow induced by the motion of the rotary shaft 1 is produced, as indicated by an arrow X. Because the arrow Y and arrow X point virtually the same direction in the opening portion 7a where two flows join, lubricant oil flows in through the oil feeding hole 8a, being caught in the swirling flow. When the speed of the swirling flow increases as the rotating speed of the rotary shaft 1 increases, a flow quantity of lubricant oil that is sucked in also increases and, therefore, a flow quantity of lubricant oil passing through the oil feeding hole 8a also increases. Thereby, a relationship between the rotating speed of the rotary shaft 1 and the flow quantity of lubricant oil passing through the oil feeding hole 8a is as represented by a curve A in FIG. 5.

Figure 5:
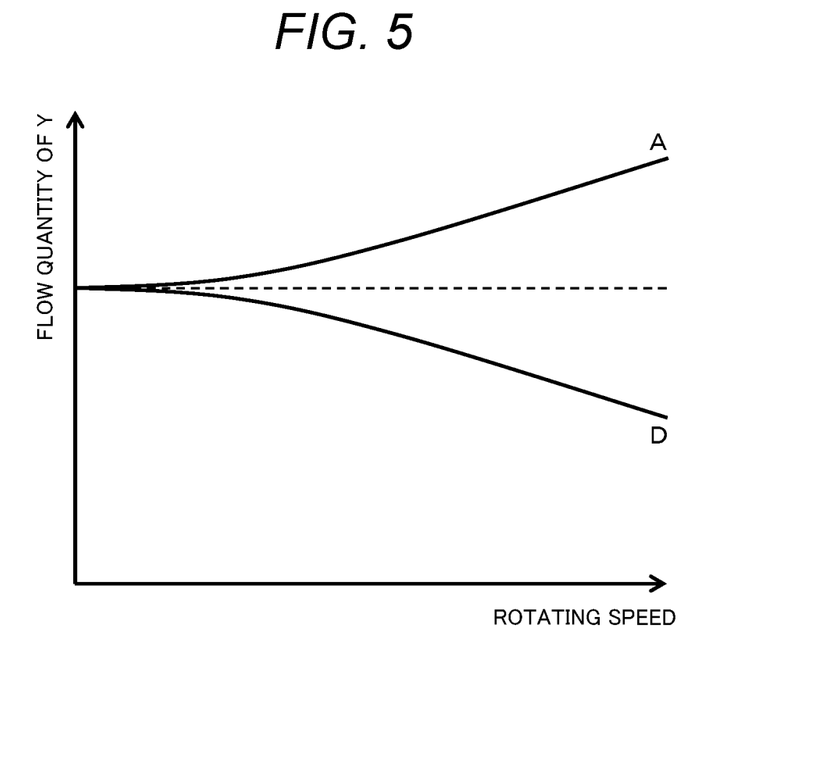
FIG. 5 is a graph representing a relationship between the quantity of a flow through an oil feeding hole and the rotating speed of the rotary shaft in the tilting pad journal bearing of the example of the present invention.

FIG. 5 is a graph representing a relationship between the quantity of a lubricant oil flow through the oil feeding hole (the quantity of a flow indicated by the arrow Y) and the rotating speed of the rotary shaft.

In FIG. 5, with regard to a flow passing through the oil feeding hole 8a depicted in FIG. 3 and a flow passing through the oil feeding hole 8d depicted in FIG. 4, a change in the flow quantity is plotted as a function of the rotating speed of the rotary shaft 1; the former flow corresponds to a curve A (the curve of the flow quantity of lubricant oil passing through the oil feeding hole 8a whose opening portion 7a is positioned near to the rearward end of the upstream bearing pad), and the later flow corresponds to a curve D (the curve of the flow quantity of lubricant oil passing through the oil feeding hole 8d whose opening portion 7d is positioned near to the forward end of the downstream bearing pad). As seen from FIG. 5, depending on the rotating speed of the rotary machine, there is a large difference in the quantity of oil that is fed due to the fact that the circumferential relative position between the opening portion of an oil feeding hole and a space between bearing pads to which lubricant oil is supplied through the oil feeding hole is adapted to differ. From this, by disposing the oil feeding holes so that the circumferential relative position between the opening portion of an oil feeding hole and a space between bearing pads to which lubricant oil is supplied through the oil feeding hole differs depending on the position of a bearing pad, it is possible to adjust the flow quantity of low-temperature lubricant oil flowing into spaces between bearing pads for each space between bearing pads when the rotating speed of the rotary shaft has increased, and it is possible to decrease an inlet temperature of an oil film for an optional bearing pad. The present invention is based on the knowledge noted above.

Moreover, in the present example, as represented in FIG. 5, because the flow quantity of lubricant oil flowing in through the oil feeding hole 8a (the oil temperature is lower than lubricant oil existing in the spaces 10) increases as the rotating speed increases, it is possible to suppress a rise in the temperature of the spaces 10. Thereby, the inlet temperature of an oil film which is formed between the bearing pad 2a on the load-applied side and rotary shaft 1 is suppressed and, therefore, the oil film temperature and also the bearing pad surface temperature on the load-applied side can be suppressed together.

On the other hand, in the structure depicted in FIG. 4, the arrow y and arrow X point virtually opposite directions in the opening portion 7d where a flow of oil flowing in through the oil feeding hole 8d and a swirling flow which is produced in the space 10 join. Lubricant oil flowing into the space 10 through the oil feeding hole 8d flows less smoothly because it must resist the swirling flow. Because it flows even less smoothly when the speed of the swirling flow increases along with increasing in the rotating speed of the rotary shaft 1, the flow quantity of lubricant oil passing through the oil feeding hole 8d decreases. Thereby, a relationship between the rotating speed of the rotary shaft 1 and the flow quantity of lubricant oil passing through the oil feeding hole 8d is as represented by the curve D in FIG. 5. Because the flow quantity of oil flowing in through the oil feeding hole 8d decreases, as the rotating speed increases, the temperature of the space 10 rises easily. Thereby, the inlet temperature of an oil film which is formed between the bearing pad 2d on the load-free side and the rotary shaft 1 also rises, and the oil film temperature and the bearing pad surface temperature on the load-free side are raised together. However, this increase in the surface temperature of the bearing pad on the load-free side causes no problem for the entire bearing, as will be described below.

Figure 6:
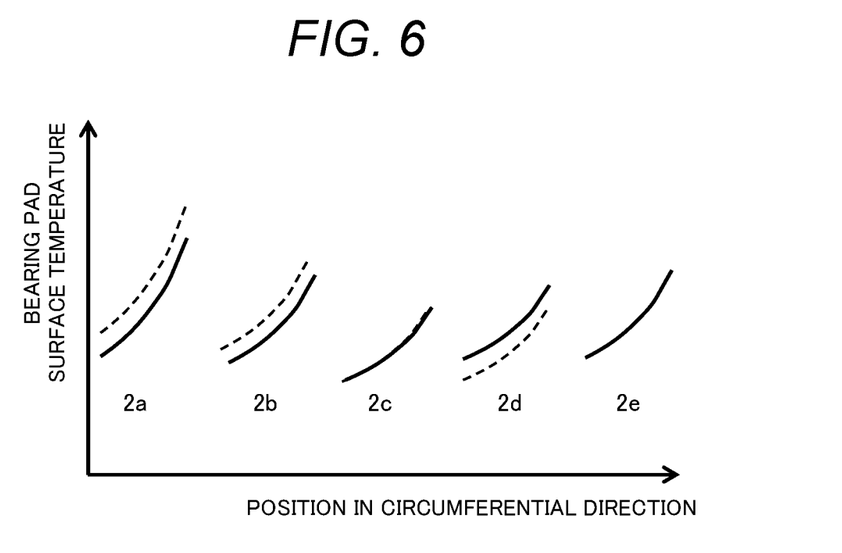
FIG. 6 is a graph representing an effect of decreasing the surface temperature of bearing pads in the tilting pad journal bearing of the example of the present invention.

Effect for the entire bearing is described with FIG. 6. FIG. 6 is a graph representing a distribution of the bearing pad surface temperature.

In FIG. 6, a distribution of the temperature of the inner peripheral surfaces of the bearing pads 2a, 2b, 2c, 2d, 2e is plotted. A dotted line denotes a distribution of the surface temperature of bearing pads in a conventional structure, and a solid line denotes a distribution of the surface temperature of bearing pads in the tilting pad bearing according to the present example. Here, the conventional structure refers to a structure in which the relative position between an oil feeding hole and a bearing pad is the same (specifically, the opening portion of an oil feeding hole is set toward a central position in circumferential direction between bearing pads for all bearing pads), regardless of a positional relation with respect to the direction of the load applied to the rotary shaft.

Between bearing pads, the circumferential position of the opening portion of an oil feeding hole in the example of the present invention is as follows. That is, the opening portion 7a of the oil feeding hole 8a is placed toward an upstream side between bearing pads in the circumferential direction as depicted in FIG. 3, and the opening portion 7d of the oil feeding hole 8d is placed toward a downstream side between bearing pads in the circumferential direction as depicted in FIG. 4. In addition, in the bearing structure depicted in FIG.

1, bearing pads experiencing a high bearing temperature are typically a bearing pad beneath the rotary shaft and a bearing pad which is adjacent downstream as viewed in the direction of gravitational force and, therefore, the opening portion 7b of the oil feeding hole 8b is placed toward an upstream side between bearing pads in the circumferential direction, as depicted in FIG. 1, namely, as is the case for the opening portion 7a of the oil feeding hole 8a. In addition, the opening portion 7c of the oil feeding hole 8c and the opening portion 7e of the oil feeding hole 8e are placed in a central position in circumferential direction between bearing pads, as depicted in FIG. 1 (the same as the circumferential position in the conventional structure).

In a case where the structure of the present example is used, the surface temperature of the bearing pad 2 is lower than in the conventional structure, as described previously. On the other hand, the surface temperature of the bearing pad 2d is higher than in the conventional structure. Nevertheless, because the bearing pad 2d is placed in a direction opposite to the load (load-applied) direction, heat generated by shear in the oil film is less and the pad temperature is lower than the bearing pad 2a. Hence, as the entire bearing, the highest bearing pad surface temperature can be kept low by the present example even under the condition of high peripheral speed, and it is possible to provide a highly reliable tilting pad journal bearing.

In addition, in the present example, the circumferential relative position of the opening portion of an oil feeding hole to supply lubricant oil to a sliding portion of a bearing pad with respect to the bearing pad can be set optionally for each bearing pad. Thereby, the quantity of oil that is fed to each bearing pad can be adjusted easily depending on the peripheral position of the bearing pad. Moreover, a difference in the quantity of oil that is fed to each bearing can be made to differ depending on operating conditions (rotating speed, peripheral speed) of the rotary machine and, therefore, the degree of freedom of designing a bearing increases.

In addition, in the foregoing example, for a bearing pad under the rotary shaft which supports the axial load of the rotary shaft, the circumferential position of the opening portion of the oil feeding hole with respect to the bearing pad is set toward an upstream side between bearing pads in the rotating direction of the rotary shaft and, for a bearing pad above the rotary shaft on a side opposite to a side supporting the axial load of the rotary shaft, the circumferential position of the opening portion of the oil feeding hole with respect to the bearing pad is set toward a downstream side between bearing pads in the rotating direction of the rotary shaft; nevertheless, this may be modified, for example, such that, for a bearing pad under the rotary shaft which supports the axial load of the rotary shaft, the circumferential position of the opening portion of the oil feeding hole with respect to the bearing pad is set toward an upstream side between bearing pads in the rotating direction of the rotary shaft and, for the other bearing pads, the circumferential position of the opening portion of the oil feeding hole with respect to the bearing pad may be set toward a central position in circumferential direction between bearing pads. In this case, although less of an effect can be expected than the foregoing example, lubricant oil becomes easy to be supplied to a space between bearing pads on the load-applied side and a larger quantity of oil can be fed to a bearing pad on the load-applied side than in the conventional structure. Likewise, a modification may be made such that, for a bearing pad above the rotary shaft on the side opposite to the side which supports the axial load of the rotary shaft, the circumferential position of the opening portion of the oil feeding hole with respect to the bearing pad is set toward a downstream side between bearing pads in the rotating direction of the rotary shaft and, for the other bearing pads, the circumferential position of the opening portion of the oil feeding hole with respect to the bearing pad may be set toward a central position in circumferential direction between bearing pads. In this case, although less of an effect can be expected than the foregoing example, the quantity of oil flowing into a space between bearing pads is constrained on the load-free side and, therefore, a larger quantity of oil is fed to bearing pads including a bearing pad on the load-applied side than in the conventional structure.

In addition, in the foregoing example, because the structure is such that the bearing pad 2a is disposed beneath the rotary shaft as viewed in the direction of gravitational force, the opening portion 7b of the oil feeding hole 8b to feed lubricant oil to the bearing pad 2b is also set toward an upstream side in the circumferential direction; nevertheless, in the case of a structure in which there is a space between bearing pads beneath the rotary shaft as viewed in the direction of gravitational force (a bearing of a load-between-pads type), it is expedient that the opening portions of oil feeding holes to feed oil to bearing pads lying on both sides should be disposed to toward an upstream side between pads in the circumferential direction.

In addition, in the foregoing example, the entire oil feeding hole 8a (the entire opening portion 7a) on the load-applied side is placed toward an upstream side relative to the inter-pad central position 3a in circumferential direction; nevertheless, with the objective of orienting a flow indicated by the arrow Y in the same direction of a swirling flow indicated by the arrow X, at least a central position of the oil feeding hole (opening portion) in a circumferential direction may be placed toward an upstream side relative to the central position in circumferential direction between bearing pads, so that the effect of the present example can be expected. However, to obtain the effect of the present example more surely, it is desirable that the entire oil feeding hole (opening portion) is placed toward an upstream side relative to the central position in circumferential direction between bearing pads. Furthermore, as depicted in FIG. 3, it is desirable that an upstream-side inner periphery of the oil feeding hole 8a (opening portion 7a) is set substantially aligned with an axial extension line of a downstream side surface of the bearing pad 2e. These are true also for the oil feeding hole 8d on the load-free side. That is, as for the load-free side, with the objective of orienting a flow indicated by the arrow Y in a direction opposite to a swirling flow indicated by the arrow X, at least a central position of the oil feeding hole (opening portion) in a circumferential direction may be placed toward a downstream side relative to the central position in circumferential direction between bearing pads, so that the effect of the present example can be expected. Moreover, to obtain the effect of the present example more surely, it is desirable that the entire oil feeding hole (opening portion) is placed toward a downstream side relative to the central position in circumferential direction between bearing pads. Furthermore, as depicted in FIG. 4, it is desirable that a downstream-side inner periphery of the oil feeding hole 8d (opening portion 7d) is set substantially aligned with an axial extension line of an upstream side surface of the bearing pad 2d.

In addition, in the foregoing example, the oil feeding holes 8a to 8e are assumed to have the same diameter; nevertheless, the diameter of an oil feeding hole on the load-applied side may be made larger than the diameter of an oil feeding hole on the load-free side, so that a larger quantity of oil is fed to the bearing pad on the load applied side.

Figure 7:
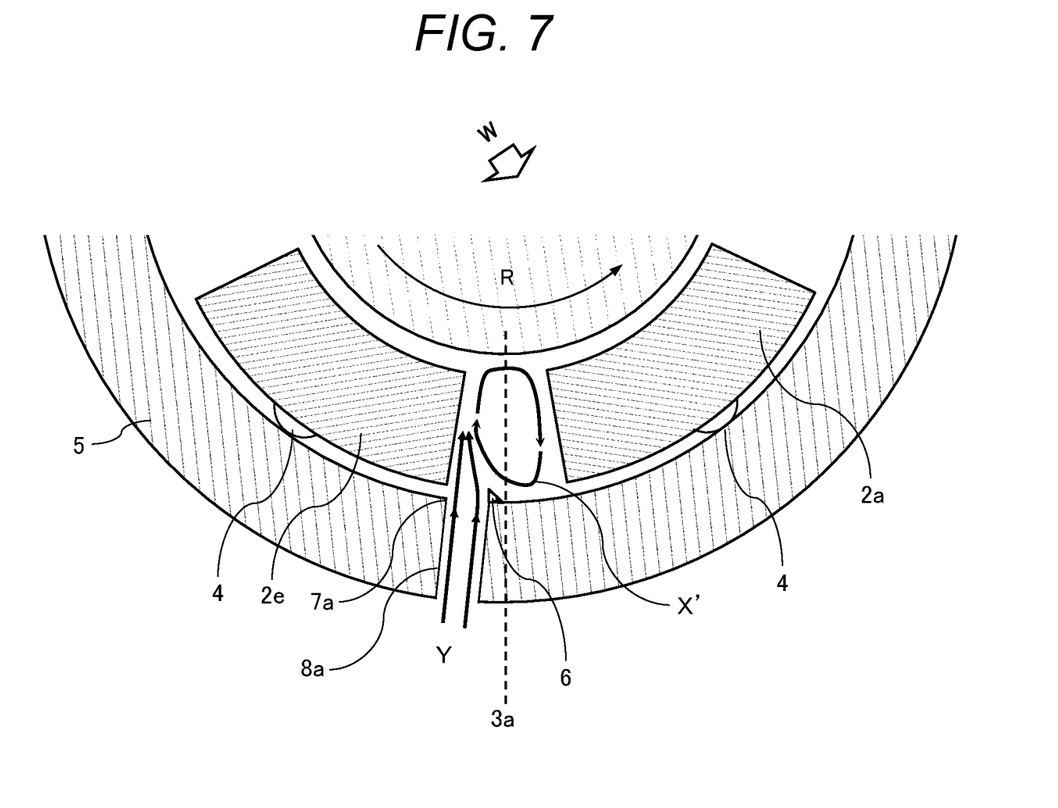
FIG. 7 is a partial transverse sectional view depicting a detailed structure of a tilting pad journal bearing of another example of the present invention.

Then, another example of the present invention is described with FIG. 7. FIG. 7 is a partial cross-sectional view of the load-applied side, which depicts a detailed structure of the tilting pad journal bearing of the present example (the partial cross-sectional view corresponding to FIG. 3 for the foregoing example). Additionally, in the present example, parts equivalent to those in the foregoing example are assigned identical reference designators and their description is omitted, as appropriate.

The difference in FIG. 7 from FIG. 3 lies in that a protrusion 6 is disposed on the inner peripheral surface of the bearing housing 5 at a downstream side of the opening portion 7a of the oil feeding hole 8a in the rotating direction. In the present example, the protrusion 6 has the same axial directional width as the axial directional width of the opening portion 7a and has an incline providing an increased circumferential width on the inner peripheral surface of the bearing housing 5 so that a swirling flow smoothly flows in the vicinity of the protrusion 6. The swirling flow in the space 10 is redirected, affected by the protrusion 6, so that the flow indicated by the arrow X near the opening portion 7a becomes more congruent with the arrow Y. Thereby, lubricant oil easily flows in through the oil feeding hole 8a, being caught in the swirling flow. Thereby, a larger quantity of low-temperature lubricant oil flows into the space 10 between bearing pads and a temperature rise can be suppressed effectively. The inlet temperature of an oil film which is formed between the bearing pad 2a on the load-applied side and rotary shaft 1 is also suppressed and, therefore, the oil film temperature and also the bearing pad surface temperature can be suppressed together. Hence, the highest bearing pad surface temperature can be kept low by the present example as well, and it is possible to provide a highly reliable bearing.

Features of the tilting pad journal bearing according to the foregoing examples of the present invention can be, for example, organized as follows.

(1) In a tilting pad journal bearing including plural bearing pads arranged in place along the outer periphery of a rotary shaft, a cylindrical housing which holds the bearing pads in a manner that the pads are swingable, an annular groove around the outer periphery of the housing which is disposed around the housing, and sealings disposed on the inner peripheral surface of the axial directional end portions of the housing with clearance to the housing, as many oil feeding holes as the plural bearing pads which connect the inner peripheral surface of the housing between each of the plural bearing pads and the groove around the outer periphery of the housing are disposed such that a peripheral relative position between an oil feeding hole and a bearing pad differs depending on the position of the bearing pad.

(2) In (1) above, preferably, an oil feeding hole which is disposed on a side of a bearing pad in a direction opposite to the rotating direction, the bearing pad being placed on a side in a direction of a load applied to the rotary shaft, is placed toward a side opposite to the rotating direction relative to a central position in circumferential direction between the bearing pad and its adjacent bearing pad in the direction opposite to the rotating direction. In addition, an oil feeding hole which is disposed on a side of a bearing pad in the direction opposite to the rotating direction, the bearing pad being placed on a side in a direction opposite to the direction of the load applied to the rotary shaft, is placed toward a side in the rotating direction relative to a central position in circumferential direction between the bearing pad and its adjacent bearing pad in the direction opposite to the rotating direction.

(3) In (1) or (2) above, preferably, a protrusion is disposed on the inside of the bearing housing at a side, in the rotating direction, of an opening portion of an oil feeding hole on a side of a bearing pad in the direction opposite to the rotating direction, the bearing pad being placed in the direction of the load applied to the rotary shaft.

<Example of Structure of Rotary Machine Applying Tilting Pad Journal Bearing>

Figure 8:
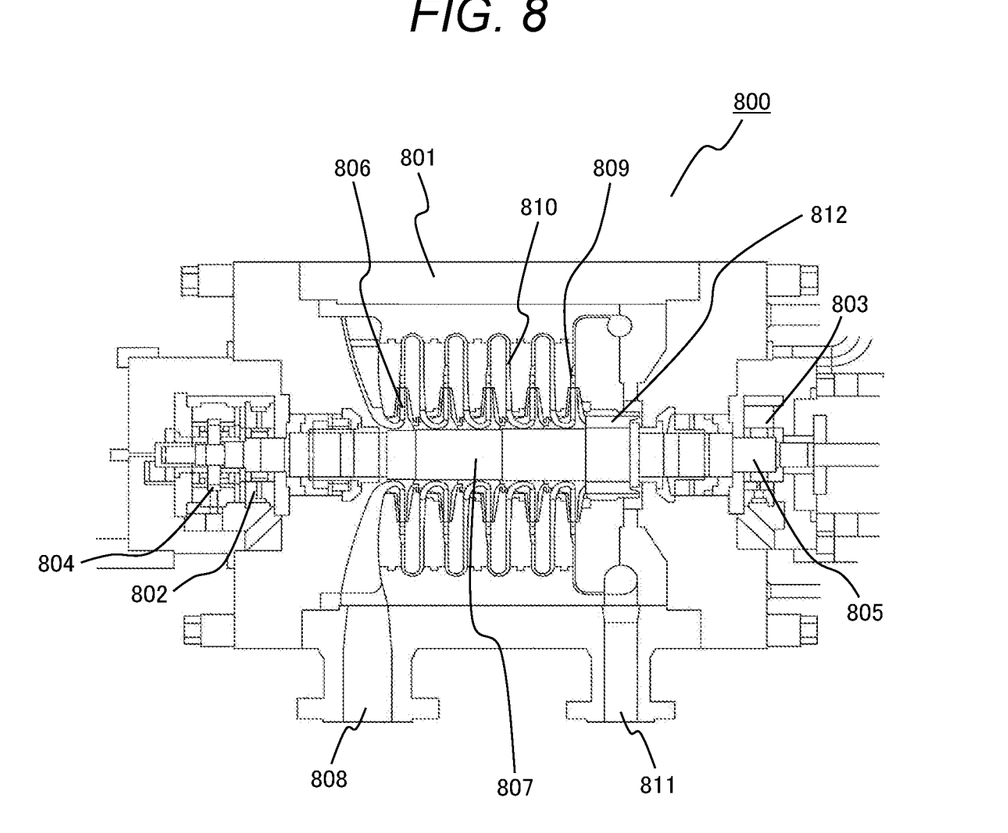
FIG. 8 is a diagram depicting an example of a structure of a rotary machine to which a tilting pad journal bearing of the present invention is applied.

Then, an example of a structure of a rotary machine applying a tilting pad journal bearing of the present invention is described with FIG. 8. FIG. 8 is a longitudinal sectional view depicting an overall structure of a centrifugal compressor which is one of typical turbo machines.

In FIG. 8, the centrifugal compressor 800 includes a casing 801 serving as a stationary part (stator) formed in a cylindrical shape or the like, a rotary shaft 805 disposed rotatably inside the casing 801, supported by radial bearings 802, 803 and a thrust bearing 804, and multiple stages (five stages in FIG. 8) of impellers 806 attached to the rotary shaft 805. The rotary shaft 805 and the impellers 806 constitute a rotor 807. Additionally, in the present example, the description takes as an example the centrifugal compressor of a single-shaft, multiple-stage type in which multiple stages of impellers 806 are disposed on one rotary shaft 805; however, application is also possible for a single-stage centrifugal compressor with only one stage of an impeller 806 in the same way.

In the casing 801, inter alia, the following are disposed: an intake flow path 808 which introduces gas which is working fluid to a first stage impeller 806; a diffuser 809 which coverts kinetic energy of gas emitted from each stage impeller 806 to pressure energy; a return flow path 810 which introduces compressed gas from the diffuser 809 to a next stage impeller 806; and an ejecting flow path 811 which ejects gas emitted from a last stage impeller 806 out of the casing 801.

The rotary shaft 805 of the rotor 807 is rotatably supported via the radial bearings 802, 803 disposed on an intake side end (left in FIG. 8) and an ejection side end (right in FIG. 8) of the casing 801. Also, the thrust bearing 804 which is subjected to a thrust load is disposed on the intake side end of the rotary shaft 805, and a balancing piston 812 which balances out the thrust load is disposed on the ejection side of the last stage impeller 806 in the rotary shaft 805.

A driving machine (omitted from depiction) such as a motor is coupled to the ejection side end of the rotary shaft 805, and the rotor 807 is driven to rotate by the driving machine. Also, an arrangement is made such that, with rotation of the rotor 807, gas is drawn in through the intake flow path 808, compressed in turn by the multiple stages of impellers 806, and finally ejected through the ejecting flow path 811.

In the structure described above, tilting pad journal bearings of the present invention are used for the radial bearings 802, 803. To downsize and speed up the centrifugal compressor, it is required to increase the peripheral speed of the bearings. Along with an increase in the peripheral speed of the bearings, the bearing temperature rises and this poses an increased risk of damaging the bearings. By using the tilting pad journal bearings of the present invention as the radial bearings 802, 803, a larger quantity of oil can be fed to a pad on a load-applied side under the condition of high peripheral speed, and it is enabled to suppress a rise in the temperature of a pad on the load-applied side under the condition of high peripheral speed. As a result, it is possible to realize downsizing and speeding up the centrifugal compressor, suppressing a rise in the bearing temperature. In other words, application of the tilting pad journal bearings of the present example to the centrifugal compressor enables it to increase the rotating speed and, therefore, a high-pressure or high-flow centrifugal compressor can be realized.

Now, the present invention is not limited to the examples described hereinbefore, and various modifications are included therein. For example, the foregoing examples are ones described in detail to explain the present invention clearly and the invention is not necessarily limited to ones including all components described. In addition, a subset of the components of an example may be replaced by components of another example and components of another example may be added to the components of an example. In addition, for a subset of the components of each example, other components may be added to the subset or the subset may be removed or replaced by other components.

The invention claimed is:

1. An oil bath type tilting pad journal bearing having a plurality of bearing pads, comprising:
   the plurality of bearing pads being configured so that lubricant oil is supplied to spaces between the bearing pads through oil feeding holes formed in a bearing housing,
   each of the spaces existing between one of the bearing pads and an adjacent one of the bearing pads upstream to the one of the bearing pads in a rotating direction of a rotary shaft,
   wherein a circumferential relative position between an opening portion of each of the oil feeding holes feeding oil toward each of the spaces and each of the spaces differs depending on the position of each of the bearing pads,
   wherein a first bearing pad (a) of the plurality of bearing pads is placed beneath the rotary shaft in a direction of gravitational force and, for the first bearing pad (a) and a second bearing pad (b) of the plurality of bearing pads which is adjacently positioned downstream of the first bearing pad (a) in the rotating direction of the rotary shaft, the opening portion is placed toward an upstream side of the space existing between the first bearing pad (a) and the second bearing pad (b) in the rotating direction of the rotary shaft.

2. The tilting pad journal bearing according to claim 1, wherein for a third bearing pad (e) of the plurality of bearing pads which is adjacently positioned upstream of the first bearing pad (a) in the rotating direction of the rotary shaft and a fourth bearing pad (c) of the plurality of bearing pads which is adjacently positioned downstream of the second bearing pad (b) in the rotating direction of the rotary shaft, the opening portion is placed toward a central position of the spaces existing respectively between the third bearing pad (e) and the first bearing pad (a), and between the fourth bearing pad (c) and the second bearing pad (b) in a circumferential direction.

3. The tilting pad journal bearing according to claim 2, wherein for a fifth bearing pad (d) of the plurality of bearing pads which is positioned downstream of the fourth bearing pad (c) in the rotating direction of the rotary shaft and positioned upstream of the third bearing pad (e) in the rotating direction of the rotary shaft, the opening portion is placed toward a downstream side of the space existing between the fifth bearing pad (d) and the fourth bearing pad (c) in the rotating direction of the rotary shaft.

4. The tilting pad journal bearing according to claim 1, further comprising:
   a protrusion disposed on an inner peripheral surface of the bearing housing at a downstream side of the opening portion that is placed toward the upstream side of the space existing between the first bearing pad (a) and the second bearing pad (b) in the rotating direction of the rotary shaft.

5. A rotary machine comprising a rotary shaft and a radial bearing which supports the rotary shaft,
   wherein a tilting pad journal bearing according to claim 1 is used as the radial bearing.

* * * * *